April 1, 1924.

C. L. MARSHALL

PNEUMATIC TIRE

Filed March 27, 1920      2 Sheets-Sheet 1

1,488,998

Inventor
Charles Lancaster Marshall,
By B. Singer, Atty.

Patented Apr. 1, 1924.

1,488,998

UNITED STATES PATENT OFFICE.

CHARLES LANCASTER MARSHALL, OF LONDON, ENGLAND.

PNEUMATIC TIRE.

Application filed March 27, 1920. Serial No. 369,340.

*To all whom it may concern:*

Be it known that I, CHARLES LANCASTER MARSHALL, of 27 Queen Victoria Street, London, E. C. 4, England, have invented certain new and useful Improvements in Pneumatic Tires, of which the following is a specification.

My invention relates to improvements in pneumatic tires and their manufacture and is an improvement in or modification of the invention described in my earlier application for Patent No. 322494 filed 8th September 1919 and relates to the manufacture of an inflated air tube in combination with gas or air impregnated spongy rubber filling for pneumatic tires and the like, and has for its object to provide for pneumatic tires the combination of an inflated tube and a filling within the said tube of gas or air impregnated vulcanized spongy rubber under pressure.

The advantages of this combination or air and vulcanized spongy rubber filling for pneumatic tires is fully described in my earlier application for patent. The further advantages of the present invention is in providing a convenient and interchanging form of the combination in a tube suitable for use in all makes of pneumatic tires of any given size. Particularly will this be found of service in pneumatic tires when used for commercial vehicles, as this form of tube is readily and easily transferable from a worn to a new tire whenever required without the aid of special tools or any expensive method of application. One of the disadvantages of gas impregnated vulcanized spongy rubber filling when it contains a high gas pressure is that it is found impracticable to supply the filling in a suitable portable form to enable the ordinary motorist to effectively apply the same within a pneumatic tire cover, and to transfer the filling from one tire cover to another without the aid of special appliances for the purpose, and if it were accomplished the pressure would not be maintained as in the transference a quantity of the gas would escape from the material thus lowering the requisite pressure. By the use of my improved form of air inflated tube and vulcanized spongy rubber filling, I provide the necessary means to adequately control the pressure at all times within any pneumatic tire cover.

In order that my invention may be properly understood and readily carried into effect, I have hereunto appended two sheets of drawings, of which—

Figure 1:
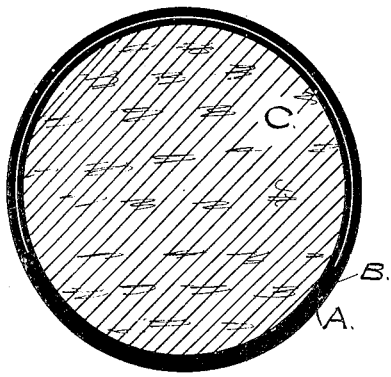
Figure 1 shows an ordinary inflated tube B, C being the gas impregnated vulcanized spongy rubber filling which is joined to the tube at A.A.
Figure 2:
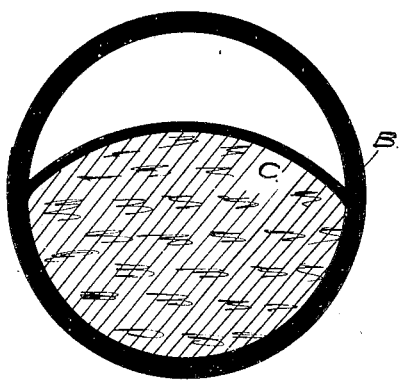
Figure 2 shows the same tube B with the compression of the filling C when subjected to the air pressure within the tube when in a tire cover.
Figure 3:
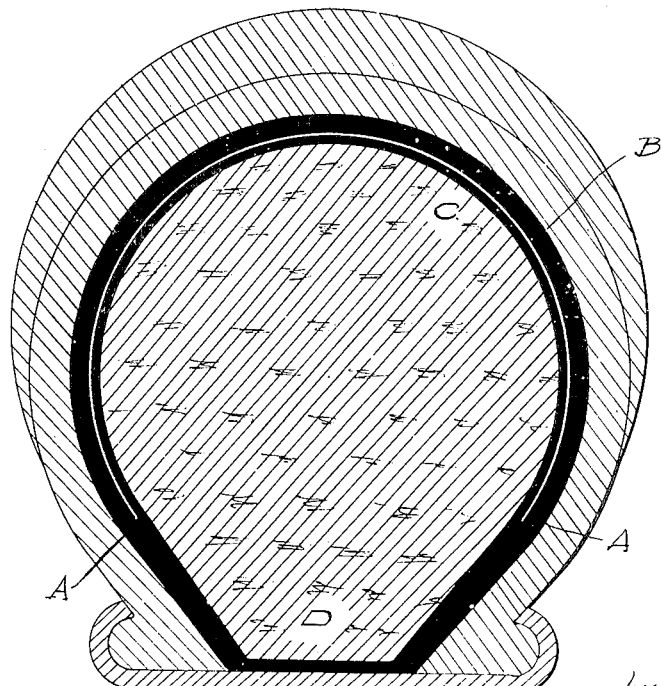
Figure 3 shows a moulded form D of an air inflated tube B with the vulcanized spongy rubber filling C jointed to the tube at A. A.
Figures 5, 6:
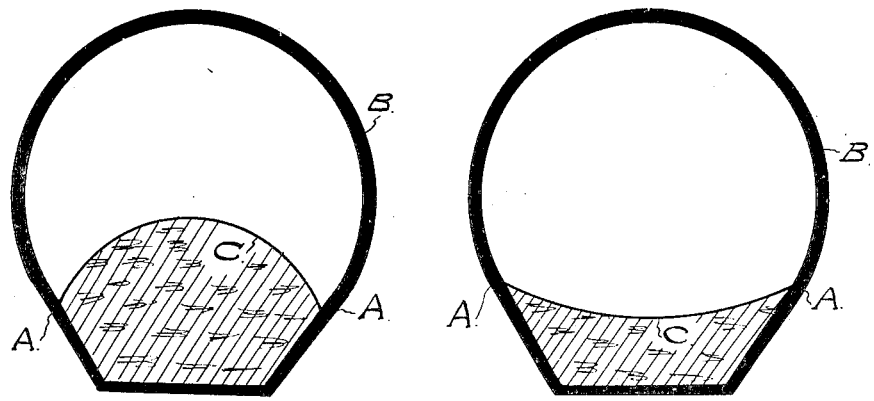
Figure 5 shows an air inflated tube B, with a reduced amount of vulcanized spongy rubber filling C jointed to the tube at A. A.
Figure 6 shows the same tube B, with the vulcanized spongy rubber C under pressure and serving the purpose of a distance piece and support to the tire walls at A. A.
Figure 4:
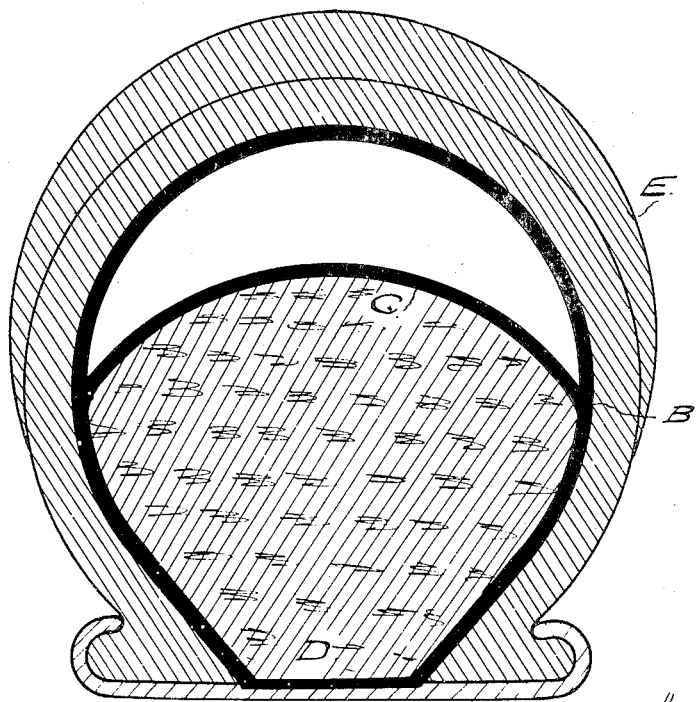
Figure 4 shows the same tube applied to another form of tire E, with the tube B inflated, with the vulcanized spongy rubber C under pressure.

In the manufacture of the air tube described, it is preferable to use the vulcanized spongy rubber filling in an endless circular formation as in that shape it can be readily used as the mould or internal form to build the air inflated tube upon. Although it is not necessary to manufacture the air tube covering for same in tubular formation, it is preferable to have it vulcanized, endless and circular in its longitudinal direction as it can then be easily placed in position over the endless spongy filling and cemented and vulcanized at the point A. A. as shown in the drawings to secure an air tight joint.

The air valve can be applied in the usual manner to the outside rubber covering and connected by a flexible tube which passes through the rubber filling to the inflated space of the air tube.

Claim.

In a pneumatic tire, the combination of an air inflated tube and a filling of gas impregnated vulcanized spongy rubber within said tube, said filling being united to the wall of said tube in a line of union extending completely around the tire and being otherwise free therefrom to permit the tube to be inflated and to cause the filling to be put under the same pressure as the tube.

In testimony whereof I affix my signature in presence of two witnesses.

CHARLES LANCASTER MARSHALL.

Witnesses:
JOHN LIDDLE,
JOHN TRAIN LIDDLE.